May 12, 1953  E. A. ROUNSEVILLE ET AL  2,638,146
REINFORCED PAPER AND METHOD AND APPARATUS
FOR THE MANUFACTURE THEREOF
Filed Jan. 7, 1949  4 Sheets-Sheet 1
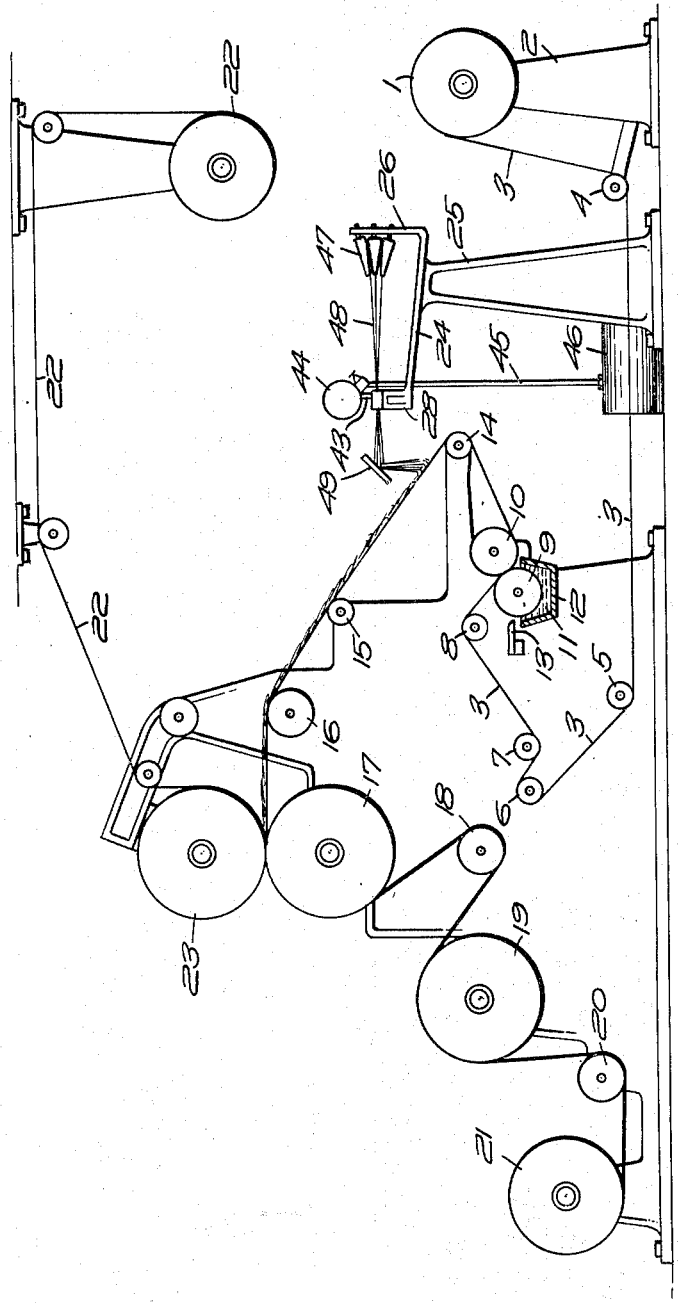
INVENTORS
Ellsworth A. Rounsville
Ralph G. Estee
BY
Townsend M. Gunn.
Attorney

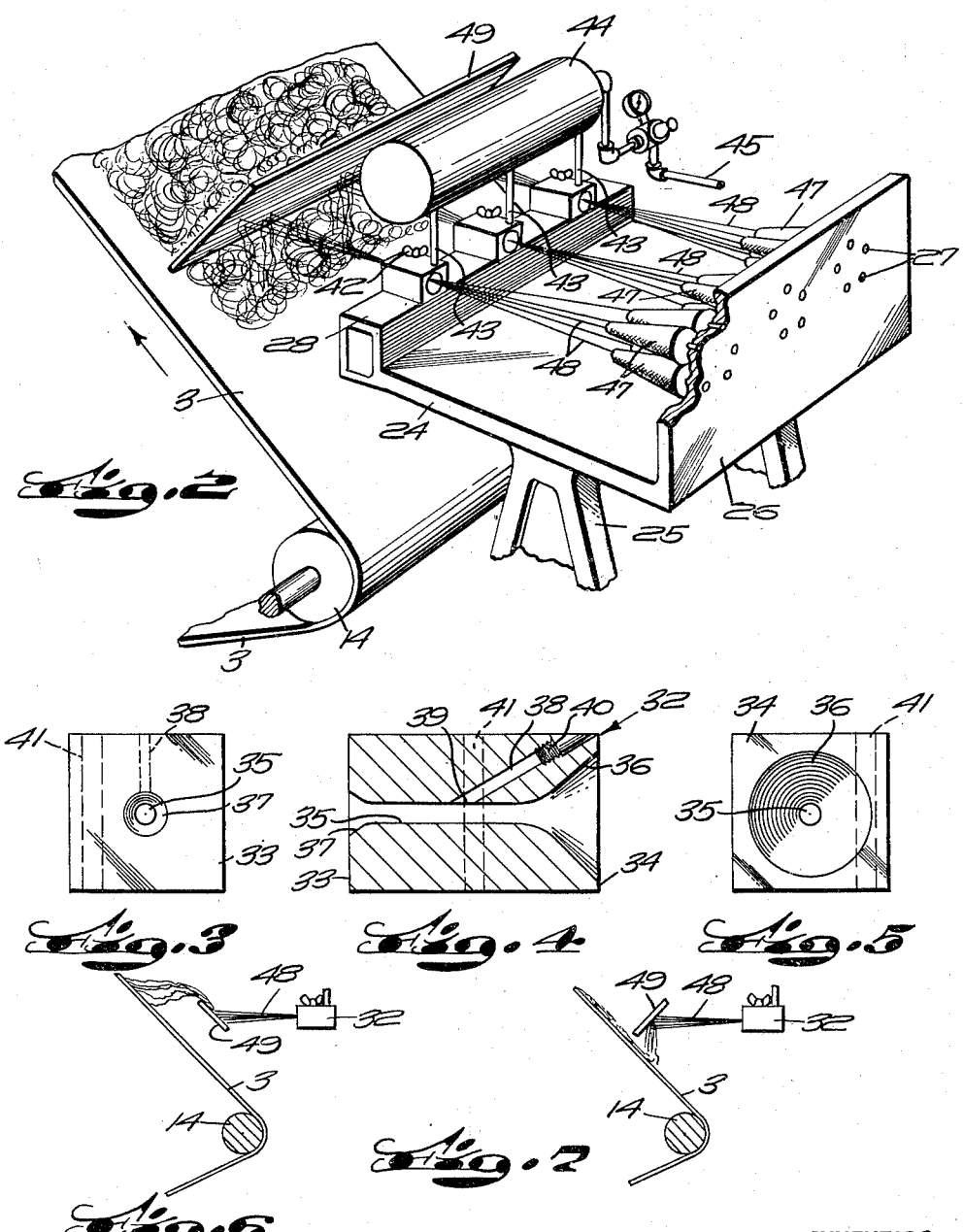

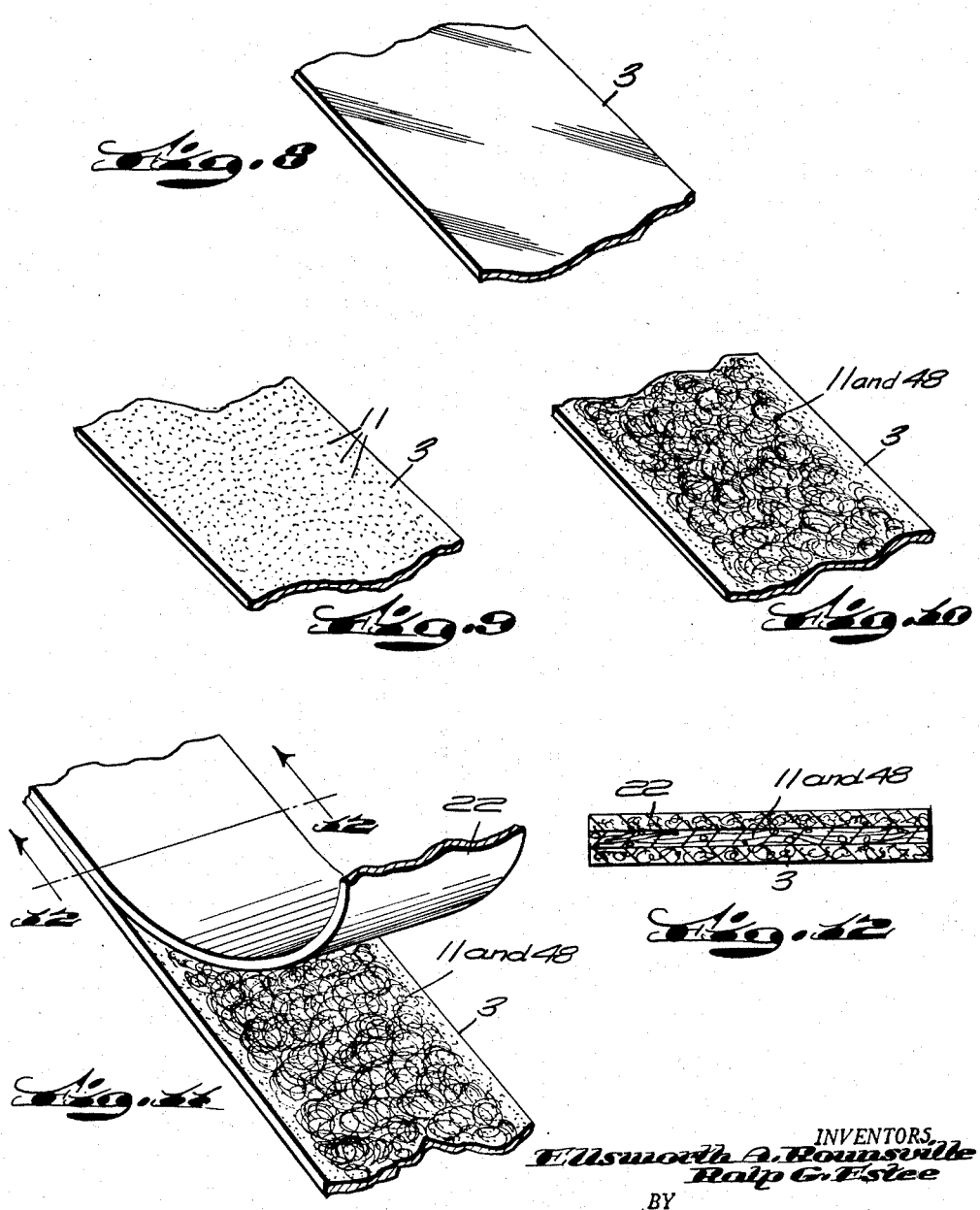

Patented May 12, 1953

2,638,146

UNITED STATES PATENT OFFICE 2,638,146

REINFORCED PAPER AND METHOD AND APPARATUS FOR THE MANUFACTURE THEREOF

Ellsworth A. Rounseville and Ralph G. Estee, Attleboro, Mass., assignors to Glas-Kraft Inc., Lonsdale, R. I., a corporation of Massachusetts Application January 7, 1949, Serial No. 69,698

27 Claims. (Cl. 154—1.76)

This invention relates to reinforced paper and a method and apparatus for producing the same, and in particular to an improved method and apparatus for depositing reinforcing fibers on a backing member which has previously been coated with a layer of adhesive, said method and apparatus providing the improved type of reinforced paper which is also a part of this invention.

Among the several objects of the invention may be noted the provision of a reinforced paper of the laminated type using a central layer of reinforcing fibers so arranged as to give the finished paper substantially equal strength in all directions; the provision of a paper of the class described which is thinner and more flexible than hitherto known laminated papers of equal strength; the provision of a laminated paper of the class described which, due to the type and arrangement of the central layers of reinforcing fibers, may be "creped" to a greater degree than prior reinforced papers, without breaking said fibers; the provision of a laminated paper of the class described in which one side may be of a type of paper which would normally be discolored by the adhesive used, and yet, when made by the method of this invention, does not so discolor; the provision of a laminated paper of the class described in which it is possible to use a thinner layer of adhesive than hitherto known laminated papers; the provision of a method for making laminated reinforced papers whereby the thickness and orientation of the reinforcing fibers may be readily controlled; the provision of a method for making laminated reinforced paper whereby the reinforcing fibers are laid down in small loops or coils which interlay and overlay each other to produce a uniform mat; the provision of a method for making laminated reinforced paper of the class described in which only one of the two layers of paper need be initially coated with the adhesive; the provision of a method and apparatus for making laminated reinforced paper of the class described whereby the fibrous laminating material may be uniformly guided and easily controlled so as to form individual narrow channels of fiber mat separated by areas wherein substantially no fiber is deposited; and the provision of simple economical apparatus for accomplishing the above objects.

Other objects and advantages will be in part obvious and in part pointed out hereinafter.

In the accompanying drawings in which are shown both schematically and in detail several embodiments of this invention, Figure 1 is an elevation showing schematically apparatus for carrying out this invention;

Figure 2 is a perspective view showing in greater detail a part of the apparatus of Figure 1;

Figure 3 is an exit end view of one of the blowers used in this invention;

Figure 4 is an elevation in cross-section of the blowers of Figure 3, showing in detail the method of supplying a stream of air to the central bore of the blower;

Figure 5 is an entrance end view of the blower of Figures 3 and 4;

Figure 6 is a side view showing one relationship of a blower of this invention and its associated baffle;

Figure 7 is a side view similar to Figure 6, but showing another arrangement of the blower and baffle of Figure 6;

Figure 8 is a perspective fragmentary view of a sheet of paper which is used as the blocking layer of the reinforced paper of this invention;

Figures 9 and 10 are further views of the paper of Figure 8 after the deposition thereon of adhesive and reinforcing fiber;

Figure 11 is a perspective view of the coated paper of Figure 10 with the addition thereto of the second or covering layer of paper; and Figure 12 is a cross-section of the finished paper of Figure 11, and of this invention.

Similar reference characters indicate corresponding parts throughout the several drawings.

Figure 13:
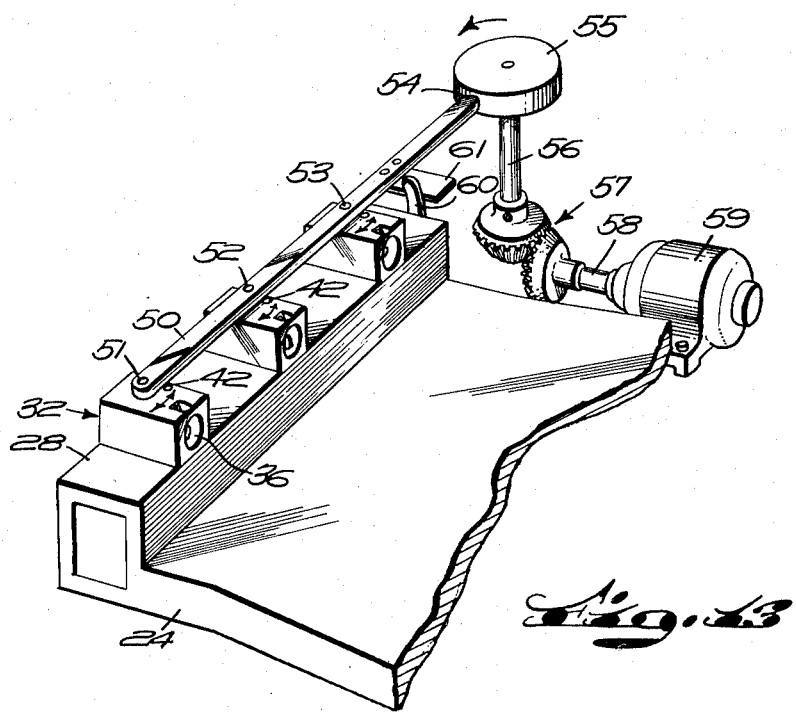
Figure 13 is a perspective view of an alternative mechanism for accomplishing this invention.

In the making of reinforced paper, it has been customary to use jute or sisal or other types of fibers as the reinforcing means, these fibers being buried in an adhesive (usually an asphaltic tar) to form a central or sandwich layer between two sheets of paper. The use of these fibers has several drawbacks, among which may be noted the thickness of the fibers which requires a relatively thick coating of adhesive. In order to be sure of embedding the fiber, it is necessary to coat both the sheets of paper with the adhesive, and if the sheets are thin or of open texture, the coating of hot tar may discolor them. Furthermore, such a reinforced paper is not too satisfactory where the laminated paper is later to be creped (that is, wrinkled to form crepe paper), the fibers in such case often breaking. We have found, however, that the use of glass fibers as a reinforcing means does away with these objections in a satisfactory manner, the glass fiber having an inherently high tensile strength, and being thin enough so that only one of the paper sheets need be coated with the adhesive in order to be sure the fiber is completely covered (to permit a bonding over substantially all of the surfaces to be bonded together). Then, when the uncoated second sheet is pressed onto the mat of tar and fiber, the tar being somewhat cooled and no longer "wet," little if any discoloration takes place. By "wet" we mean that phase of an adhesive in which there is present a relatively large quantity of readily flowable liquid. Hence, papers hitherto unusable because of discoloration when coated with a wet adhesive, may now be used in these laminated papers. In addition, paper made in accordance with this invention can be satisfactorily creped without breaking the glass fibers.

It is also to be noted that in most laminated papers, the tear strength of the paper should preferably be the same in all directions. Many ways of accomplishing this by arrangement of the reinforcing fibers have been used, one of the best being a pattern wherein the fibers are laid down on the backing member in transverse and longitudinal parallel rows. However, even this arrangement does not lead to as uniform tear strength as could be desired, and also the method involves the use of complicated and expensive machinery for laying the fibers in the proper pattern. We have discovered a method of applying the said glass fibers in such a way that the deposited fibers take approximately circularly arranged paths, the coils or loops of fibers intermixing and overlapping and underlapping each other. The method permits of the close control of the amount of glass fiber deposited per unit area of the paper, as well as the compactness and uniformity of the pattern. Our method also permits the laying down, on a relatively wide sheet of paper, of relatively narrow lanes of fibrous mat wherein the fibers in each lane have the same looped formation and can be controlled uniformly as to quantity, and the boundaries of each lane can be substantially controlled. The method also permits of varying the quantity and loop or coil formation of the fibers in each lane independently of these characteristics in other lanes.

Referring now to Figure 1, there is shown the general organization of a machine for carrying out the present invention. A roll of paper 1 is supported on hanger 2 and the paper 3 therefrom is fed beneath an idler roll 4 and under and over the rolls 5, 6, 7, and 8 as shown. These various rolls are provided, in accordance with well-known practice, to smooth out and straighten paper 3. From a roll 8, paper 3 passes over adhesive roll 9 and under roll 10. Roll 9 picks up adhesive 11 carried in trough 12 suitably placed under roll 9 and carries it to and deposits it on one surface of paper 3. A wiper bar 13 is provided in order to adjust and control the thickness of adhesive picked up by roll 9. From roll 10 the paper is passed around roll 14 and thence (after the reinforcing fibers are deposited) over rolls 15-20 to the final take-up roll 21. A second roll of paper 22, suitably mounted, is fed into the machine over various smoothing and straightening rolls as shown to engage with the coated side of paper 3 between rolls 23 and 17 by means of which the two sheets of paper are pressed together in intimate contact. The resulting laminated paper then passes to take-up roll 21.

The above method and apparatus for conveying and pressing together the two sheets of paper are already known in the art and are not a part of our invention.

Among other aspects, our invention is concerned with the method of depositing the reinforcing fibers onto the adhesive-coated side of paper 3 in the space between rolls 14 and 15. This will now be described in detail, reference being had to Figures 2 et seq.

A plate 24 is mounted by some suitable means, such as pedestal 25, in front of roll 14 and somewhat higher than roll 14. Plate 24 carries at its rear end an upright member 26 on which are mounted forwardly-extending pegs 27. At the front end of plate 24 is a flat cross beam or support 28 to which are rotatably mounted the blowers 29, 30 and 31. For each blower there is one set of pegs 27, and the pegs of each set are mounted in a circle and inclined inwardly so that the longitudinal axis of each peg would intersect, if extended, the center of the rear face 34 of each blower. That is, the pegs of each set so incline inwardly toward each other that the projected axes of the pegs define a cone having its apex at the center of the rear face 34 of the blower associated with that set of pegs and its base on member 26. The center of the circle on which the pegs are mounted lies preferably on the axial line of the bore 35 of its associated blower.

Each of said blowers 29, 30 and 31 comprises a rectangularly shaped metal block (preferably steel) 32 having a front or exit face 33 and a rear or entrance face 34. A bore or cylindrical channel 35 is provided in each blower. At the entrance or rear face 34 of the blower, bore 35 enlarges to form a bell-mouth entrance throat 36. At the exit or front face of the blower, bore 35 similarly enlarges, but not to the same extent, to form exit throat 37. A second bore or channel 38 is provided in the blower, and is inwardly inclined so that one end 39 thereof intersects and connects with bore 35 at a point preferably approximately central between faces 33 and 34. For best operation of the blower it is important that the axis of bore 38 lie in the same plane as the axis of bore 35. The other end 40 of bore 38 opens out on one exterior surface of the blower, here shown as the top of the blower. End 40 is here shown as interiorly threaded to receive a nipple for connection to an air line. A hole 41 is drilled transversely through blower 32 as shown, at one side thereof so as not to intersect bore 35, in order to permit a bolt 42 to pass therethrough for fastening the blower to support 28. It will be observed that with this single point mounting, each of the blowers can be rotated about bolt 42 and thereafter clamped in place so as to direct each blower independently to a predetermined point on the paper 3.

In the construction of the blowers, it is important that the bore 35 and the entrance and exit throats 36 and 37 be highly polished with no sharp corners being left. For this reason, the drawings show the connection between the bore 35 and the throats fully rounded in somewhat exaggerated manner. The connection does not need to be as rounded as shown provided a sharp corner is not left.

As an example of a blower that has successfully worked, the block 32 was made approximately 2 inches long by 1¼ inches square. The bore 35 was made ⅛ inch in diameter, and bore 38 was made 1/16 inch in diameter. The throat 36 was made approximately 1 inch in diameter on face 34 and met bore 35 approximately ½ inch in from face 34. Throat 37 was approximately 5/16 inch in diameter on face 33 and met bore 35 approximately ⅛ inch in from face 33.

The blowers are mounted on support 28 approximately as shown (three being shown by way of example, the total number being determined by the width of paper and amount of fiber deposit desired. As shown, the blowers are in straight line arrangement across the width of the paper. To avoid having the blowers make lanes of fiber, it may be found preferable to stagger the blowers so that the fibers from one will overlap fibers from another. To each blower is connected at bores 38 a flexible air hose 43. Hoses 43 lead preferably from an air pressure equalizing tank 44 mounted above the blowers, the purpose of the tank being to make sure each blower receives the same air pressure. A pipe 45 connects tank 44 to air reservoir tank 46 which in turn is connected to a source of compressed air such as an air compressor.

Mounted on each of pegs 27 is a spool 47 of spun glass fiber. By spun fiber we mean a composite fiber comprising a plurality of individual glass filaments which have been spun or twisted together to form a single thread. We have found, as an example, that the fiber glass manufactured by the Owens-Corning Fiberglas Corporation under the trade designation 150-10 fiber glass approximately .077 inch in diameter works satisfactorily with the blowers described above. This is a so-called unbalanced fiber. By unbalanced fiber we mean a spun fiber which in its finished spun form has a tendency to untwist or unravel. Spools 47 do not rotate on pegs 27. From each spool a composite fiber 48 of fine glass threads is led through bore 35 of the associated blower. We have shown five spools of fiber associated with each blower, and hence the bore 35 of each blower will have five such fibers 48 passing through it.

If, now, compressed air is blown into the bore 35 of each blower via the bore 38, it will be found that the air will exert a force on the fibers 48 to carry them out of the blower at the exit throat 37 and deposit them on the coated surface of paper 3, the fibers being stripped from the spools 47. At this point one of the features of the invention is realized. As each fiber 48 is stripped from its non-rotating spool 47, a torsional stress is imparted to the fiber. This stress is maintained at least in part during the passage of the fiber through the blower, and in addition to this twist, the action of the air in the blower may impart a further twist to the fiber, so that when the fiber finally strikes the coated surface of paper 3, this stress in relieving itself causes the fiber to lie on the coated surface in small coils or loops. Furthermore, the film is deposited on the paper 3 at a rate faster than the paper is moving away from the blowers, and this tends to make the fiber curl into loops. Since each blower is conveying five fibers and since the compressed air tends to expand and disperse slightly upon emergence from throat 37, the fibers from a blower are likewise dispersed in a random manner, with the result that upon final deposition on the coated surface of paper 3, the fibers form a closely intermixed but foraminous mat in which the fibers lie in intermixed coils or loops. As the fibers are deposited on the paper, the paper is continuously being moved away from the blowers, so that succeeding unfibered but coated surface will receive its deposit.

In some instances, we prefer to oscillate each blower slightly about its mounting bolt 42. Reference to Figure 13 will indicate one way in which this may be done. A shuttle bar 50 is mounted across the front end of each blower, by means of the pegs 51, 52 and 53 which rotate in suitable holes in bar 50. An end 54 of bar 50 makes contact with the cam surface of cam wheel 55, which is driven by means of shaft 56, gears 57, shaft 58 and motor 59. The shafts, gears, and motor may be journalled in any proper and convenient manner to support the cam in operative relation to shuttle bar 50. A leaf-type return spring 60, mounted on one end of support 28 and bearing against side extension 61 of shuttle bar 50, serves to hold the end 54 of shuttle bar 50 in engagement with the cam 55.

Upon rotation of cam 55, shuttle bar 50 will be caused to move back and forth as indicated by the arrow, the amount depending upon the degree of eccentricity of cam 55. As bar 50 so moves, it rotates each of the blowers about its mounting bolt 42. This causes the fibers from each blower to spray out and overlap the fibers from the blowers adjacent to it, and results in some instances in a more uniform mat of fibers than if the blowers were not oscillated.

With the arrangement thus far described, control of the deposition can be realized, but not to the extent desired. It is at this point that another feature of our invention must now be described.

Mounted in front of each blower in a position to be struck by the fibers of glass emerging from throat 37, is a baffle board 49 made of glass or metal or some other material capable of withstanding the abrasive action of the glass fibers. The relationship of a blower, its baffle board, and paper 3 is such that upon the fibers striking the baffle board, they are deflected either upwardly or downwardly, depending on the angle at which the baffle board is mounted. Baffle 49 preferably should be very smooth. Figures 6 and 7 show in general how the strands behave after they strike the baffle board. If it is desired to have the strands disperse uniformly on paper 3 with good intermixing of the strands over the total width of the paper, the baffle board 49 is arranged to deflect the strands upwardly, after which they fall on the coated surface of paper 3. If, on the other hand, it is desired to have the strands from each blower form a distinct lane of matted strands separate from and independent of the lanes formed by the other blowers, the baffle 49 should be positioned to deflect the strands downwardly. If desired, a single baffle board against which the fibers from all the blowers strike, may be used.

The exact reason for the baffle board's giving better control is not known, but it is surmised that it has something to do with the forward momentum of each strand and the effect of the baffle board on the air stream. It is observed that the baffle board does aid in the intermixing of the separate fibers, probably due to the increased turbulence of the air. Whatever the reason, the use of the downwardly deflecting baffle board permits of better control of the said lanes, especially as to obtaining relatively cleanly defined edges thereof. It has been observed that if the baffle is placed close to the exit end of the associated blower, the lane formation is very pronounced. As a general rule, the baffle 49 should be placed as close to the paper 3 as possible and should be very smooth.

As an alternative arrangement, the blowers may be mounted at the side of the paper so that the direction of the air blast is transverse to the direction of motion of the paper. Baffles are again used, and if set to deflect the fibers downwardly, a very pronounced lane effect is produced. In this arrangement, the baffles and associated blowers would be placed in staggered relation across the width of the paper.

In general, the amount of reinforcing fiber deposited per unit area can be controlled by regulating the pressure of the air used to transport the fibers, by the number of strands per blower, the number of blowers, and the speed of the paper as it passes the deposition point. The amount of intermixing can be controlled by the angle of the baffle board, and by the position of the baffle board in relation to the blower and the paper. The amount of coiling or looping that the individual fiber assumes as it "lies down" on the coated surface of the paper can be controlled by changing the distance from the baffle board to the place where the fibers deposit on the paper after being deflected.

As an example of a specific arrangement of parts which has been used satisfactorily to make the laminated paper of this invention, the following may be mentioned: Three blowers of the type and size mentioned above were arranged as shown in Figure 2, being spaced approximately four inches apart. Associated with each blower were five pegs 27 carrying five spools of the fiber glass specified above. The distance from the face 34 of each blower to the nearest end of the spools was approximately two feet. The pressure equalizing tank 44 was approximately four inches in diameter and fed each blower through approximately six inches of one-half inch rubber hose. Baffle boards 49 were mounted approximately ten inches from the blowers and about four inches above paper 3. Sufficient air pressure to cause about 2½ cubic feet of air per minute to flow from each blower was used. The lineal paper speed was varied from 10 feet per minute to 250 feet per minute, satisfactory deposits of fiber being obtained over a paper width of one foot, the amount of deposit varying as before mentioned, with the paper speed.

In Figures 8-12 there is depicted the successive steps in the formation of the paper of this invention, with the component parts shown. The backing layer of paper 3 is shown first coated with the adhesive 11 on which is then deposited the reinforcing fibers 48 as already has been described. Onto this prepared sheet is then pressed the uncoated sheet of paper 22 to complete the reinforced paper of this invention. The loop arranged, randomly oriented, and intermixed character of the reinforcing mat of fibers should be noted, since, as already set forth, it is this pattern which gives the final paper its substantially uniform tear strength in all directions. The ability to use an uncoated paper 22 as the other layer leads to the advantages already set forth, as well as a faster setting time for the adhesive, because of the ability to use only a thin layer of adhesive as well as the fact that a dry and a wet surface will set faster than if both surfaces are wet with adhesive.

It should also be noted that by the use of glass fibers, the fiber thickness can be kept small for a given tensile strength. Being small, the fibers can sink into and be completely covered by a thin layer of the tar or adhesive, the two thicknesses being of about the same order of thickness.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. The method of making laminated reinforced paper comprising coating one side of a first sheet of paper with a layer of adhesive, pulling a plurality of continuous lengths of unbalanced spun fibers having a torsional stress from a source thereof, conveying said fibers to the coated surface while maintaining at least a part of said stress in each fiber, allowing the stress to become relieved at least in part by letting the fibers take randomly looped paths on the coated surface, and thereafter pressing a second sheet of paper onto said coated surface, said fibers sinking into the adhesive to permit the latter to bond the two sheets of paper together.

2. The method of making laminated reinforced paper comprising coating one side of a first sheet of paper with a layer of adhesive, pulling a plurality of continuous lengths of unbalance spun fibers having a torsional stress from a source thereof, conveying said fibers to the coated surface while maintaining at least a part of said stress in each fiber, allowing the stress to become relieved at least in part by letting the fibers take randomly looped paths on the coated surface, and thereafter pressing a second sheet of paper onto said coated surface, said fibers sinking into the adhesive to permit the latter to bond the two sheets of paper together, said second sheet of paper being uncoated with adhesive before said bonding.

3. The method of making laminated reinforced paper comprising feeding one or more continuous lengths of unbalanced spun fibers into a stream of air while imparting a twist to the fiber, conveying said fiber by means of said air stream to a continuously moving surface of a backing layer of paper which has been coated with adhesive, depositing the fiber on said surface at a rate faster than said surface is moving so that the fiber can at least partially relieve the twist in it by lying in a series of randomly overlapping loops on said surface, and thereafter pressing a second sheet of paper onto said surface.

4. The method of making laminated reinforced paper comprising stripping a plurality of continuous lengths of unbalanced spun fibers from a source thereof while imparting a twist to each of said fibers, feeding said fibers into a forwardly-moving stream of air while maintaining at least partially the twist in each fiber, conveying the fibers to the adhesive-coated surface of a first sheet of paper, depositing said fibers on said surface while allowing each fiber to relieve its twist by lying in randomly overlapping loops on said coated surface, causing said loops to intermix with the loops formed by other fibers to form a foraminous mat of fibers, and thereafter pressing an uncoated second sheet of paper onto said coated paper.

5. The method of making laminated reinforced paper comprising stripping a plurality of continuous lengths of unbalanced spun fibers from a source thereof while imparting a twist to each of said fibers, feeding said fibers into a forwardly-moving stream of air while maintaining at least partially the twist in each fiber, conveying the fibers to the adhesive-coated surface of a first sheet of paper, depositing said fibers on said surface while allowing each fiber to relieve its twist by lying in randomly positioned loops on said coated surface, causing said loops to intermix and overlap with the loops formed by other fibers to form a foraminous mat of fibers, and thereafter pressing an uncoated second sheet of paper onto said coated paper, said adhesive being thicker than the mat of fibers, whereby said fibers can sink completely into the coating to permit the latter to bond the two sheets together.

6. The method of making laminated reinforced paper comprising feeding one or more fibers into a stream of air, causing said stream of air to convey the fibers in a first direction, interposing deflecting means in the path of said fibers to deflect the fibers into a second direction, allowing the fiber to deposit on the adhesive-coated surface of a first sheet of paper in relatively small loops lying in the adhesive coat, and thereafter pressing a second sheet of paper onto the coated surface of the first sheet.

7. The method of making laminated reinforced paper comprising feeding one or more continuous fibers into a stream of air while imparting a twist to each fiber, conveying the fiber by means of said air stream in a first direction, interposing deflecting means in the path of said fibers to deflect the fibers into a second direction, thereafter depositing the fibers on an adhesive-coated surface of a first sheet of paper while allowing each fiber to relieve its twist by lying in a series of relatively small loops on said coated surface, and thereafter pressing a second sheet of paper onto said coated surface.

8. The method of making laminated reinforced paper comprising feeding a plurality of fibers into a stream of air, causing said stream of air to convey said fibers against a baffle board angularly placed, in relation to the path of the fibers, so as to deflect the fibers upwardly, permitting the fibers thereafter to fall onto an adhesive-coated surface of a first sheet of paper and form relatively small loops thereon, and thereafter pressing a second sheet of paper onto the coated surface of said first sheet.

9. The method of making laminated reinforced paper comprising feeding a plurality of fibers into a stream of air, causing said stream of air to convey said fibers against a baffle board angularly placed, in relation to the path of the fibers, so as to deflect the fibers downwardly against an adhesive-coated surface of a first sheet of paper, causing said fibers to form relatively small loops on said surface, and thereafter pressing a second sheet of paper onto the coated surface of said first sheet.

10. In the manufacture of reinforced paper, the method of depositing reinforcing fibers in distinct lanes of matted fibers across the width of an adhesive-coated surface of a sheet of paper comprising feeding a plurality of said fibers into each of a series of air streams arranged across the width of the paper, causing each air stream to convey its plurality of fibers against baffling means, causing said baffling means to deflect the fibers downwardly against said coated surface while continuously moving said sheet of paper out from underneath said fibers, and permitting the fibers in each air stream to be deposited on said coated surface in relatively small loops which intermix to form a relatively narrow lane of foraminously matted fibers.

11. In the manufacture of reinforced paper, the method of depositing reinforcing fibers in a substantially uniform layer across the width of an adhesive-coated surface of a sheet of paper comprising feeding a plurality of said fibers into each of a series of air streams arranged across the width of the paper, causing each air stream to convey its plurality of fibers against baffling means interposed in the path of each of the air streams while directing each of said air streams fan-wise across a portion of said baffling means, causing said baffling means to deflect the fibers against said coated surface while continuously moving said sheet of paper out from underneath said fibers, and permiting the fibers to deposit on said coated surface in relatively small loops which intermix to form a foraminous mat of such looped fibers overlying said coated surface.

12. Apparatus for depositing a continuous length of fiber onto a backing member so as to form a foraminous mat of said fiber thereon, comprising an air blower mounted in such position with respect to the backing member as to direct a stream of air toward the backing member, means for feeding into the air blower and into the interior air stream thereof a continuous length of fiber from a source thereof mounted in back of the air blower, said air stream carrying the fiber with it as it issues from the air blower toward the backing member, and deflecting means acting on said fiber intermediate the blower and the backing member in order to change the initial direction of the fiber before it reaches the backing member.

13. Apparatus for depositing a continuous length of fiber onto a backing member so as to form a foraminous mat of said fiber thereon, comprising an air blower mounted in such position with respect to the backing member so as to direct a stream of air toward the backing member, means for feeding into the air blower and into the interior air stream thereof a continuous length of fiber from a source thereof mounted in back of the air blower, said air stream carrying the fiber with it as it issues from the air blower toward the backing member and deflecting means acting on said fiber stream intermediate the blower and the backing member and adjusted to cause said fiber to strike the backing member at a point thereon nearer to the air blower than if the fiber were undeflected.

14. The apparatus of claim 13, wherein said deflecting means is a smooth baffle board inclined at an angle to said air stream.

15. The apparatus of claim 13, wherein said air blower comprises an elongated block having a smooth cylindrical passageway therethrough from end to end adapted to receive therein both a continuous jet of air and a continuous length of fiber with means for introducing said air into said passageway intermediate the ends thereof, and wherein said deflecting means is a smooth baffle board inclined at an angle to said air stream.

16. Apparatus for depositing a continuous length of fiber onto a backing member so as to form a foraminous mat of said fiber thereon, comprising an air blower mounted in such position with respect to the backing member as to direct a stream of air toward the backing member, means for feeding into the air blower and into the interior air stream thereof a continuous length of fiber from a source thereof mounted in back of the air blower, said air stream carrying the fiber with it as it issues from the air blower toward the backing member, and deflecting means acting on said fiber stream intermediate the blower and the backing member and adjusted to cause the fiber to strike said backing member at a point thereon further from the air blower than if the fiber were undeflected.

17. The apparatus of claim 16, wherein said deflecting means is a smooth baffle board inclined at an angle to said air stream.

18. The apparatus of claim 16, wherein said air blower comprises an elongated block having a smooth cylindrical passageway therethrough from end to end adapted to receive therein both a continuous jet of air and a continuous length of fiber with means for introducing said air into said passageway intermediate the ends thereof, and wherein said deflecting means is a smooth baffle board inclined at an angle to said air stream.

19. Apparatus for depositing a continuous length of fiber onto a backing member so as to form a foraminous mat of said fiber thereon, comprising an air blower mounted in such position with respect to the backing member as to direct a stream of air toward the backing member and adapted to receive into and discharge from itself a continuous length of fiber and means for mounting a source of the fiber relative to the air blower in such manner that as a continous length fiber is taken therefrom and fed into the blower a twist is imparted to the fiber, said air stream carrying the fiber with it in its passage from the air blower toward the backing member, and deflecting means acting on said air stream and fiber intermediate the air blower and the backing member in order to change the initial direction of said fiber before it reaches the backing member.

20. The apparatus of claim 19, wherein said deflecting means is a smooth baffle board inclined at an angle to said air stream.

21. The apparatus of claim 19, wherein said air blower comprises an elongated block having a smooth cylindrical passageway therethrough from end to end adapted to receive a continuous jet of air and a continuous length of fiber with means for introducing said air into said passageway intermediate the ends thereof, and wherein said deflecting means is a smooth baffle board inclined at an angle to said air stream.

22. A sheet of composite reinforced paper comprising two sheets of paper bonded together by a central layer of adhesive, said layer containing a deposit of continuous reinforcing unbalanced spun fibers lying in a substantially limp state loosely meshing with each other in a foraminous mat of randomly looped fibers sunk into and covered by said adhesive.

23. A sheet of composite reinforced paper comprising a plurality of sheets of paper bonded together by a central layer of adhesive, said layer containing a plurality of continuous reinforcing unbalanced spun fibers forming a foraminous mat in which said fibers are randomly arranged in loops, said paper thereby having in any direction along the paper a plurality of fibers lying approximately perpendicular to said direction.

24. A sheet of composite reinforced paper comprising two sheets of paper bonded together by a central layer of adhesive, said layer containing a mat of continuous unbalanced spun glass fibers lying in a substantially limp state, said fibers being arranged in loops randomly overlapping and intermixing with one another, said loops being smaller than the width of said sheets of paper.

25. A sheet of composite reinforced paper comprising a plurality of sheets of paper bonded together by a central layer of adhesive, said layer containing a deposit of continuous reinforcing unbalanced spun glass fibers arranged in a foraminous mat, the thickness of said fibers being of the same order of thickness as the layer of adhesive.

26. The composite reinforced paper of claim 25, wherein said fibers in said mat are arranged in loops randomly overlapping and intermixing with one another, said loops being smaller than the width of said sheets of paper.

27. A sheet of composite reinforced paper comprising a first layer of paper, a second layer of paper overlying said first layer, and a layer of adhesive between the said layers, said adhesive layer containing a deposit of continuous reinforcing fibers intermixing with one another to form a foraminous mat sunk into and covered by said adhesive, said first layer of paper being of a type relatively non-absorbent of the adhesive in its wet stage, said second layer of paper being of a type relatively absorbent of the adhesive in its wet stage but relatively non-absorbent of the adhesive in its semi-dry or tacky stage.

ELLSWORTH A. ROUNSEVILLE.
RALPH G. ESTEE.

References Cited in the file of this patent

UNITED STATES PATENTS

| Number | Name | Date |
|---|---|---|
| 1,365,061 | Respess | Jan. 11, 1921 |
| 1,804,916 | Cotte | May 12, 1931 |
| 1,914,801 | Chadwick | June 20, 1933 |
| 2,076,343 | Humphner | Apr. 6, 1937 |
| 2,361,751 | Donovan | Oct. 31, 1944 |
| 2,392,882 | Roberts | Jan. 15, 1946 |

FOREIGN PATENTS

| Number | Country | Date |
|---|---|---|
| 817,841 | France | May 31, 1937 |